United States Patent
Fujino

(10) Patent No.: US 9,873,626 B2
(45) Date of Patent: Jan. 23, 2018

(54) BIOREACTOR

(75) Inventor: Kiyoharu Fujino, Mie (JP)

(73) Assignee: JAPAN ALSI CO., LTD., Mie (JP)

( * ) Notice: Subject to any disclaimer, the term of this patent is extended or adjusted under 35 U.S.C. 154(b) by 636 days.

(21) Appl. No.: 14/383,524

(22) PCT Filed: Mar. 7, 2012

(86) PCT No.: PCT/JP2012/055809
§ 371 (c)(1),
(2), (4) Date: Sep. 5, 2014

(87) PCT Pub. No.: WO2013/132610
PCT Pub. Date: Sep. 12, 2013

(65) Prior Publication Data
US 2015/0048012 A1    Feb. 19, 2015

(51) Int. Cl.
*C02F 3/00* (2006.01)
*C02F 3/30* (2006.01)
(Continued)

(52) U.S. Cl.
CPC .......... *C02F 3/006* (2013.01); *B01D 21/0042* (2013.01); *B01D 21/08* (2013.01); *B01D 21/2472* (2013.01); *B01D 21/2488* (2013.01); *B01D 21/32* (2013.01); *C02F 3/301* (2013.01); *C02F 3/302* (2013.01); *C02F 3/1284* (2013.01); *C02F 3/308* (2013.01);
(Continued)

(58) Field of Classification Search
None
See application file for complete search history.

(56) References Cited

U.S. PATENT DOCUMENTS

| 4,948,518 | A | 8/1990 | Turgay |
| 9,573,829 | B2 * | 2/2017 | Fujino ................ B01D 21/0042 |

FOREIGN PATENT DOCUMENTS

| AU | 32364/89 A | 10/1989 |
| DE | 3812715 A1 | 10/1989 |
| EP | 0338198 A1 | 10/1989 |
| JP | 37-14858 Y1 | 6/1962 |
| JP | 47-30158 A | 11/1972 |
| JP | 49-28165 A | 3/1973 |
| JP | 49-25153 Y1 | 7/1974 |
| JP | 50-74168 U | 6/1975 |

(Continued)

OTHER PUBLICATIONS

International Search Report in corresponding PCT application dated Apr. 10, 2012.
English Abstract of WO2013/132608 A1 dated Sep. 12, 2013.

*Primary Examiner* — Richard Gurtowski
(74) *Attorney, Agent, or Firm* — Hedman & Costigan, P.C.; James V. Costigan; Kathleen A. Costigan

(57) ABSTRACT

An aim of the invention is to provide a bioreactor and a waste water treatment method that employs this tank, whereby anaerobic and aerobic microorganism treatment can be continuously carried out, even when the volume of the bioreactor is large, and whereby installation costs can be minimized. The invention comprises an outer tank (2), a cylindrical inner tank (3) disposed inside this outer tank and having openings above and below, a circulation rate control device (4) for controlling the circulation rate of water to be treated in the bioreactor, the circulation rate control device (4) being provided at an upper part of this cylindrical inner tank, a cylindrical control plate (5) for bringing about sedimentation of sludge, the cylindrical control plate (5) being provided at the outer circumference of an upper part of the cylindrical inner tank, a treated-water quality measurement device (6) that is provided outside and inside of the cylindrical inner tank, a waste water supply opening (10) that is provided in the circulation pathway of the water to be treated circulating through the outer tank and inner tank, a treated water discharge opening (11) that is provided in an upper part of the outer tank, and a sedimentation-solidification prevention device (12) for preventing sedimentation-solidification of sludge that has sedimented.

11 Claims, 9 Drawing Sheets

(51) Int. Cl.
    *B01D 21/00*     (2006.01)
    *B01D 21/08*     (2006.01)
    *B01D 21/24*     (2006.01)
    *B01D 21/32*     (2006.01)
    *C02F 3/12*     (2006.01)
    *C02F 11/12*     (2006.01)
    *C02F 103/32*     (2006.01)

(52) U.S. Cl.
CPC ........... *C02F 11/12* (2013.01); *C02F 2103/32* (2013.01); *C02F 2203/00* (2013.01); *C02F 2203/006* (2013.01); *C02F 2209/04* (2013.01); *C02F 2209/06* (2013.01); *C02F 2209/22* (2013.01); *Y02W 10/15* (2015.05)

(56) References Cited

FOREIGN PATENT DOCUMENTS

| | | |
|---|---|---|
| JP | 51-144962 U | 11/1976 |
| JP | 57-078989 A | 5/1982 |
| JP | 60-165004 U | 11/1985 |
| JP | 61-015793 A | 1/1986 |
| JP | 61-37299 U | 3/1986 |
| JP | 62-62806 U | 4/1987 |
| JP | 01-270913 A | 10/1989 |
| JP | 07-308686 A | 11/1995 |
| JP | 11-128987 A | 5/1999 |
| JP | 2003-340487 A | 12/2003 |
| JP | 2004-202319 A | 7/2004 |
| JP | 2009-241045 A | 10/2009 |
| WO | 2013132008 A1 | 9/2013 |

\* cited by examiner

BIOREACTOR

TECHNICAL FIELD

The present invention relates to a bioreactor and specifically relates to a device for preventing the accumulation of sludge that accumulates in bioreactor.

TECHNICAL BACKGROUND

Waste water that contains high concentrations of pollutant substances such as organic substances, phosphorus components, and/or or nitrogen components that increase biological oxygen demand (hereinafter "BOD") and/or suspended solids concentration (hereinafter "SS") is a cause of river pollution, red tide, and other forms of environmental pollution. In the past, known methods for treating waste water that contains high concentrations of pollutant substances of this type have been the so-called modified Barnard method which is an aerobic and anaerobic circulation method. With this method, in order that the alkali that is released during denitrification reactions is reused in nitration reactions, the denitrification step in the active sludge treatment step is divided into two stages, a first denitrification tank and a second denitrification tank, which are located before and after the first nitration tank. In addition, in this method, a second nitration tank is provided after the second denitrification tank, and mixed solution flowing out of the first and second nitration tanks is circulated to the first denitrification tank.

However, the following problems arise with waste water treatment carried out using this method.
(1) High-concentration ammoniacal nitrogen has bactericidal properties, and therefore often impedes activation of activated sludge during the activated sludge treatment step. Activated sludge treatment will therefore be insufficient.
(2) With so-called modified Barnard methods, the hydrogen ion concentration (hereinafter "pH") decreases with progression of the nitration reaction in the nitration tank, but the nitration reaction depends on pH, becoming slower as the pH decreases. As a result, the activated sludge treatment expectedly becomes inadequate, and phosphorus removal and the like will also be insufficient.
(3) When the denitrification reaction slows due to insufficient activated sludge treatment, the residual ammonia and/or nitrate and nitrite ion concentrations will increase. As a result, the BOD that is dependent on these nitrogen compounds will increase, and waste water treatment will become insufficient.
(4) High-concentration activated sludge is required for waste water containing high concentrations of contaminants, and there is thus an unavoidable tendency for increased concentrations of activated sludge suspended solids (hereinafter "MLSS"). For this reason, oxygen supply becomes difficult, and stirring the activated sludge as well as solid-liquid separation at the sedimentation tank become difficult.
(5) When activated sludge treatment is to be used for the denitrification and denitration of wastewater having high nitrogen component levels, problems such as sludge floating due to denitrification and/or pH decrease arise, regardless of whether the organic contaminant concentration is low.

In order to respond to problems with the methods described above, the inventors of the present invention have offered a bioreactor that allows efficient activated sludge treatment of waste water containing high concentrations of contaminants such as nitrogen components, phosphorus components, and organic substances, and a waste water treatment method that uses this bioreactor (patent document 1). This bioreactor has an inner tank with a nitration reaction part and a denitrification reaction part that are linked by turbine blades.

PRIOR ART DOCUMENT

Patent Document

Patent document 1: Japanese Unexamined Kokai Patent Application No. H11-128987

SUMMARY OF THE INVENTION

Problem to be Solved by the Invention

However, with the conventional bioreactor described above, the anaerobic tank that is formed in a lower part of the inner tank in which the denitrification reaction is carried out and the aerobic tank which is formed in an upper part of the inner tank in which the nitration reaction is carried out are linked only by turbine blades, and so there is the problem that stirring in the respective tanks will become insufficient, and the anaerobic or aerobic reactions will not adequately progress as the volume of the bioreactor increases. There are also problems with increasing installation costs for the bioreactor and increasing costs of fixing the inner tank in the outer tank.

In addition, as the volume of the bioreactor increases, problems arise with accumulation of activated sludge in the bioreactor. When activated sludge accumulates, circulation of sludge and water to be treated in the bioreactor becomes difficult in some cases. In particular, there are problems with circulation of sludge when solids such as oil and sludge, adhesive suspended substances, and the like are admixed.

The present invention was developed in response to these problems, and an aim of the invention is therefore to provide a bioreactor that allows efficient activated sludge treatment of waste water containing high concentrations of pollutant substances, while also allowing anaerobic and aerobic microorganism treatment to be carried out continuously while maintaining a high tank circulation rate, even with large reactor volumes, and also while preventing accumulation of activated sludge in the bioreactor.

Means for Solving the Problem

The bioreactor of the present invention comprises an outer tank, a cylindrical inner tank disposed inside this outer tank and having openings above and below, a circulation rate control device for controlling the circulation rate of water to be treated in the bioreactor, the circulation rate control device being provided at an upper part of the cylindrical inner tank, a cylindrical control plate for bringing about sedimentation of sludge, the cylindrical control plate being provided at the outer circumference of an upper part of the cylindrical inner tank, a treated-water quality measurement device that is provided outside and inside of the cylindrical inner tank, a waste water supply opening that is provided in the circulation pathway of the water to be treated circulating through the outer tank and inner tank, and a treated water discharge opening that is provided in an upper part of the outer tank.

The cylindrical inner tank that constitutes the bioreactor is divided by a partitioning wall having a communicating hole in a center part into a cylinder upper part and a cylinder lower part, the cylinder upper part being an aerobic microorganism treatment tank having a truncated cone-shaped apex with the upper surface and bottom surface open, in which multiple air intake openings are provided at the circumferential periphery of the communicating hole in the cylinder upper part and at the circumferential edge of the partitioning wall, and the cylinder lower part being an anaerobic microorganism treatment tank having an opening in the bottom surface, where an stirrer for stirring the interior of the aerobic microorganism treatment tank and the anaerobic microorganism treatment tank and a sedimentation-solidification prevention device for preventing sedimentation-solidification of the sedimented sludge are provided inside of the outer tank, and provided inside and outside of the inner tank.

The bioreactor has a means for detecting at least one measurement value selected from the pH, the oxidation reduction potential (hereinafter "ORP"), and the dissolved oxygen level (hereinafter "DO") of the water to be treated that is measured by the treated-water quality measurement device and a means for controlling the tank circulation rate of the water to be treated at 3 to 20 in accordance with the detected measurement value described above by controlling at least one of the aperture of the liquid surface adjustment valve, the vertical movement of the liquid surface control adjustment plate, and the amount of air taken in from the air intake opening, which is provided on the circulation rate control device. The term "treatment water circulation rate" in the bioreactor used herein refers to a value defined by the following formula.

Treatment water circulation rate=Treated water volume discharged from the inner tank upper part (m³/day)/Waste water supply volume (m³/day)

The bioreactor is characterized in that aerobic microorganism treatment and anaerobic microorganism treatment are continually carried out by circulation of waste water supplied from the waste water supply opening along with activated sludge through the tank, via the interior of the cylindrical inner tank, the outer circumferential surface of the cylindrical inner tank, and the interior of the activated sludge that has sedimented in the bottom part of the outer tank.

In particular, the waste water supply opening is characterized by being multiple discharge openings or slits that are provided in an annular waste water supply part that is disposed in a lower part of the opening of the anaerobic microorganism treatment tank. The cylinder lower part is characterized by having a volume that is 1/10to one the volume of the cylinder upper part.

The sedimentation-solidification prevention device that is attached to the bioreactor is characterized by being (1) a vibrating device that is provided on the inner wall or outer wall of the outer tank bottom part where sludge sediments, (2) a device that comprises a vibrating plate that is provided near the inner wall and a resonator that is provided on an upper part of the outer tank and transmits vibrations to the vibrating plate, (3) a scraper that is provided on the inner wall of the outer tank lower part where sludge sediments, (4) an stirring flow generation device that generates a stirring flow of sludge along the inner wall of the outer tank lower part, particularly, a moving fluid spray nozzle that sprays fluid while moving across the inclined surface of the inner wall, or a fluid spray nozzle that is fixed at a prescribed distance on the inclined surface of the inner wall, or (5) a pump that sucks in sludge that has sedimented at the outer tank lower part and discharges the sludge onto the anaerobic microorganism treatment tank as a stirring flow generation device moves along the inclined surface or lower surface of the inner wall, or a pump that is fixed at a prescribed distance on an inclined surface or lower surface of the inner wall and sucks in sludge that has sedimented at the outer tank lower part and discharges the sludge onto the anaerobic microorganism treatment tank.

Effect of the Invention

The bioreactor of the present invention has a sedimentation-solidification prevention device comprising a vibrating device provided on an inner wall or outer wall of a lower part of the outer tank at which sludge sediments, a vibrating plate provided near the inner wall, a scraper provided on the inner wall, or an stirring flow generation device, and the invention thus prevents sedimentation-solidification of sludge at the lower part of the bioreactor. As a result, anaerobic and aerobic microorganism treatment of waste water containing high concentrations of pollutant substances can be continuously carried out while maintaining a high tank circulation rate. In addition, because the sedimentation-solidification prevention device is provided, the cylindrical inner tank can have a simple shape, and thus installation of the bioreactor is facilitated, even when the volume of the bioreactor tank becomes large.

MODE FOR CARRYING OUT THE INVENTION

Figure 1:
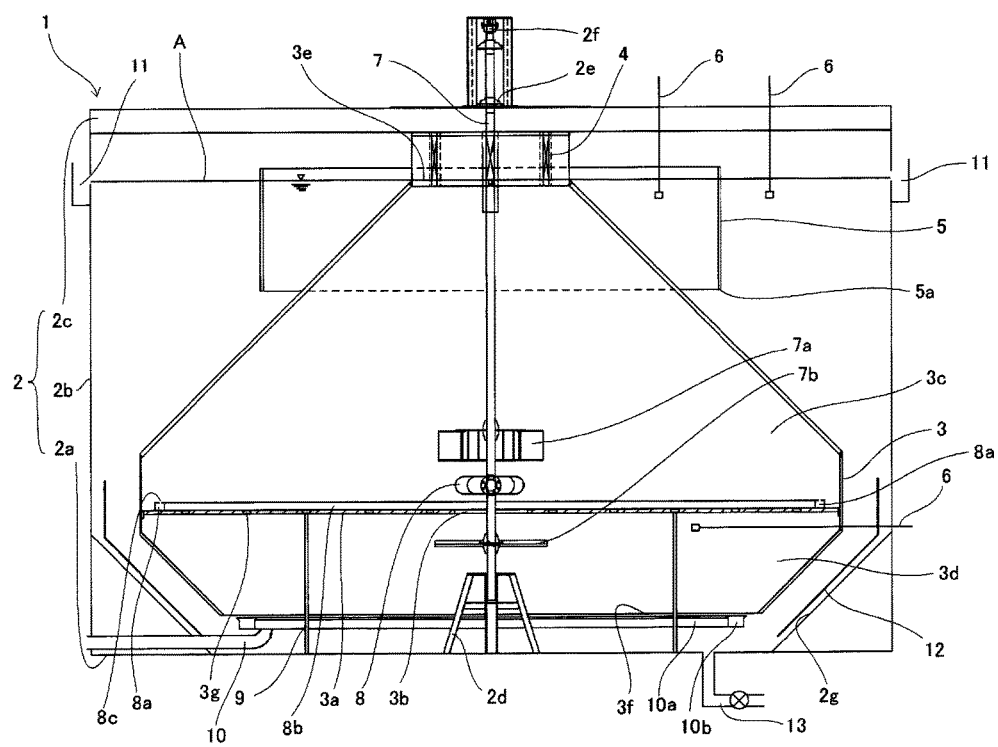
FIG. 1 is a sectional view of the bioreactor.

The bioreactor of the present invention is described with reference to FIG. 1. FIG. 1 is a sectional view of the bioreactor.

The bioreactor 1 comprises an outer tank 2, a cylindrical inner tank 3 that is disposed inside the outer tank 2, a circulation rate control device 4 that is provided in an upper part of the cylindrical inner tank 3, a cylindrical control plate 5 that is provided on the outer circumference of the cylindrical inner tank 3, and a treated-water quality measurement device 6. A sludge spray opening 13 may also be provided.

In the present invention, the water tank volume of the microorganism treatment facility is not restricted, and the invention may be utilized in small-scale or large-scale facilities. However, the merits of the invention are most fully manifest when the invention is used in bioreactor in which the bioreactor 1 has an inner volume of 20 m³ or greater, preferably 30 to 6000 m³. If the volume of the treatment tank exceeds 6000 m³, then generation of a circulating flow will become difficult. At small scales of less than 20 m³, on the other hand, little advantage will be gained in terms of vertical circulation of the sludge in the bioreactor 1.

The outer tank 2 has a cylindrical external appearance, comprising a cylindrical side surface 2b and upper surface 2c on a base 2a that serves as the bottom surface. A rotating shaft 7 for attaching stirring blades or the like is provided at the center of the cylinder. The rotating shaft 7 is rotatably fixed by a bearing 2e that is provided at the circle center of the upper surface part 2c and a mounting 2d that is provided at the circle center of the base 2a. In addition, the rotating shaft 7 is made to rotate by a drive device 2f. The upper surface part 2c fixes the rotating shaft 7 while allowing the shaft to freely rotate, and the cylindrical inner tank 3 is held by a support or the like.

A waste water supply opening 10 is provided in a lower part of the cylindrical inner tank 3 which is the bottom part of the outer tank 2. The waste water supply opening 10 is constituted by multiple discharge openings 10b or slits that are provided in an annular waste water supply part 10a that is disposed below a lower opening part 3f of the cylindrical inner tank 3. By disposing the waste water supply opening 10 in this manner, the anaerobic sludge is thoroughly stirred. The waste water supply opening 10 can be provided in a location other than a lower part of the cylindrical inner tank 3, provided that it is on the circulation pathway of the water to be treated.

In addition, a treated water discharge opening 11 is provided in an upper part of the outer tank 2. A device for preventing sedimentation-solidification 12 that is used for preventing sedimented sludge sedimentation-solidification is provided on the inner surface and outer surface of the outer tank.

The device for preventing sedimentation-solidification 12 that is used for preventing sedimented sludge sedimentation-solidification is described below.

The device for preventing sedimentation-solidification 12 may be an individual device as described below, but also may be a device for preventing sedimentation-solidification that is produced from a combination of multiple devices.

Figure 2:
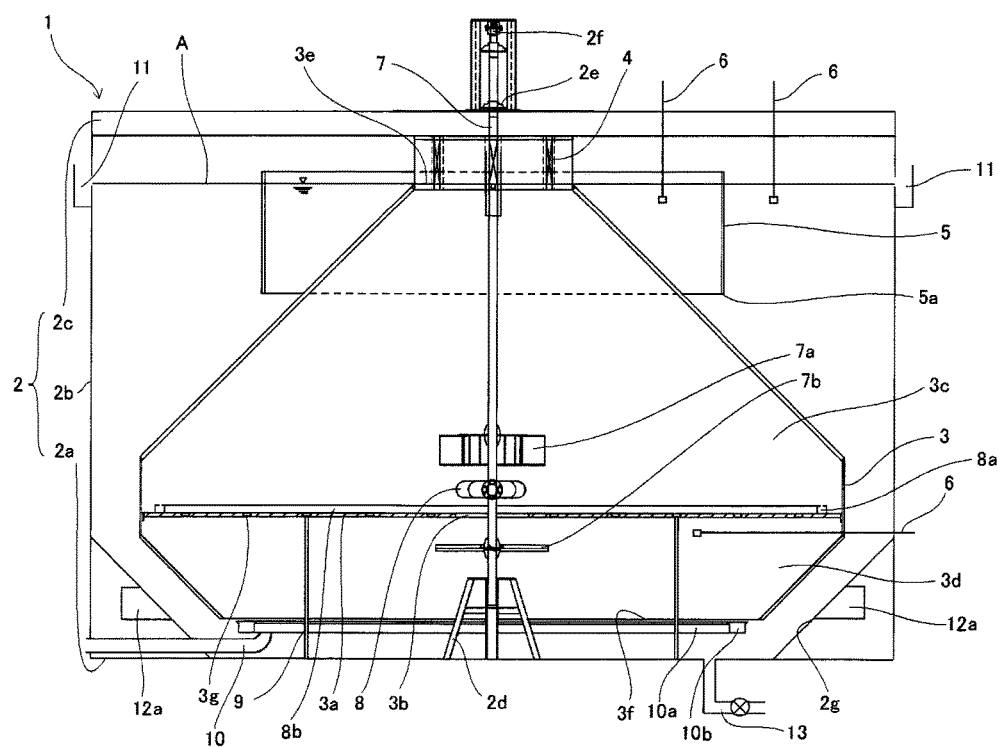
FIG. 2 is a sectional view of the bioreactor provided with a vibrating device.

(1) Vibration device provided on the inner wall or outer wall of a lower part of the outer tank at which sludge sediments A sectional view of the bioreactor in which a vibration device is provided is shown in FIG. 2. A vibration generator 12a can be fixed to a portion of the inclined lower part of the outer container. Examples of this vibration generator include an electromagnetic vibrating plate, or a knocking hammer. It is preferable for these vibration devices to run intermittently, driven by a timer. Sedimentation-solidification of sludge can be prevented by vibration of the outer tank lower part surface itself.

Figure 3:
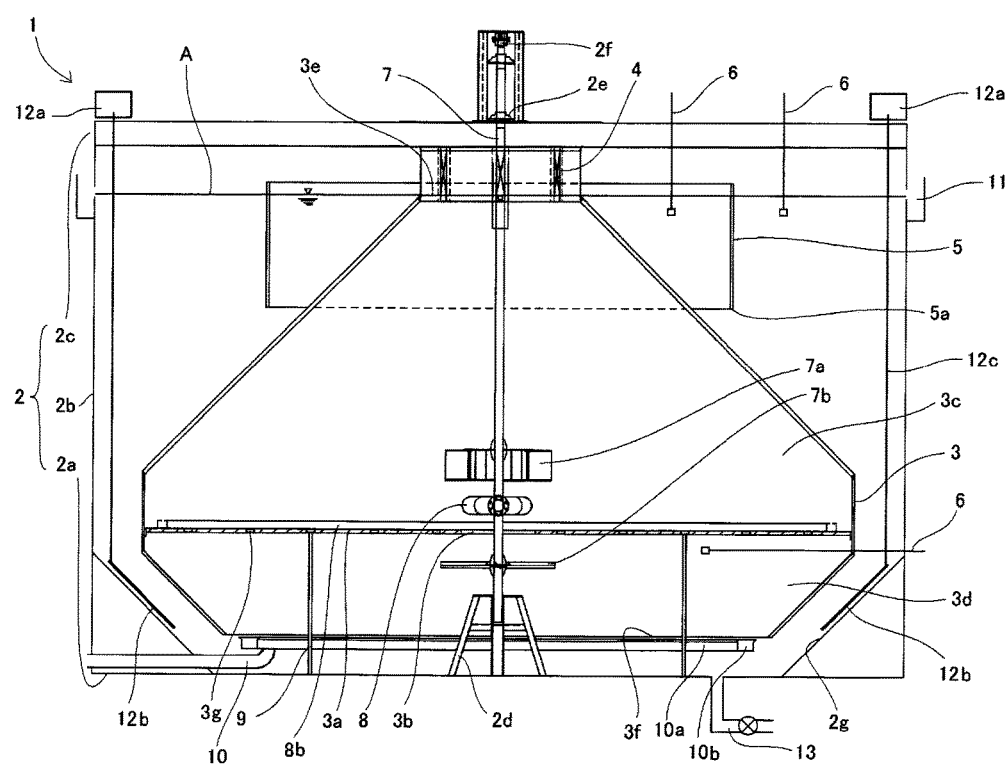
FIG. 3 is a sectional view of the bioreactor provided with another vibrating device.

(2) Device for preventing sedimentation-solidification having a vibrating plate provided near the inner wall and a vibration generator for transmitting vibrations to the vibrating plate A sectional view of the bioreactor provided with another vibrating device is shown in FIG. 3. The vibration device that is provided on the outer wall of a lower part of the outer tank is shown in FIG. 2, but accumulation of sludge at the circumferential periphery of the vibrating plate or the like is facilitated when a vibrating plate or hammer is attached to the inner wall of the outer tank lower part. For this reason, a device is produced in which the vibrating plate is attached to the inner wall of the outer tank lower part, and the vibration generator 12a is provided in an upper part of the outer tank as shown in FIG. 3, where vibration thereof causes vibrations to be transferred to the vibrating plate 12b via a rod 12c. Sludge sedimentation-solidification can be prevented by vibration of the vibrating plate 12b.

Figure 4:
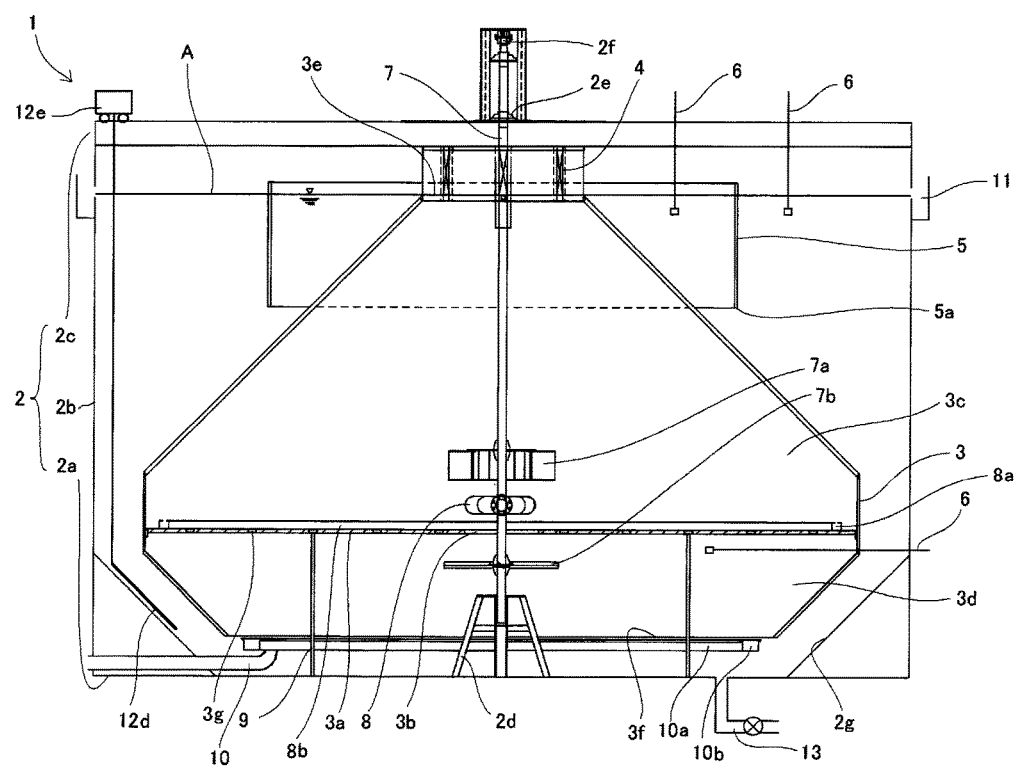
FIG. 4 is a sectional view of the bioreactor provided with a self-propelled scraper.

(3) Scraper provided on the inner wall of the outer tank lower part where sludge sediments FIG. 4 shows an example of a sectional view of a bioreactor in which an automatic scraper is provided. A moving device 12e that can move along the circumferential edge of an upper part of the outer tank is attached to the circumferential edge of the upper part of the outer tank, and a scraper 12d is attached to the distal end of this moving device 12e. The scraper 12d automatically moves along the inner wall of a lower part of the outer tank, thereby loosening the sedimented sludge and imparting fluidity. This sludge that has been made fluid will not sediment and solidify.

Figure 5:
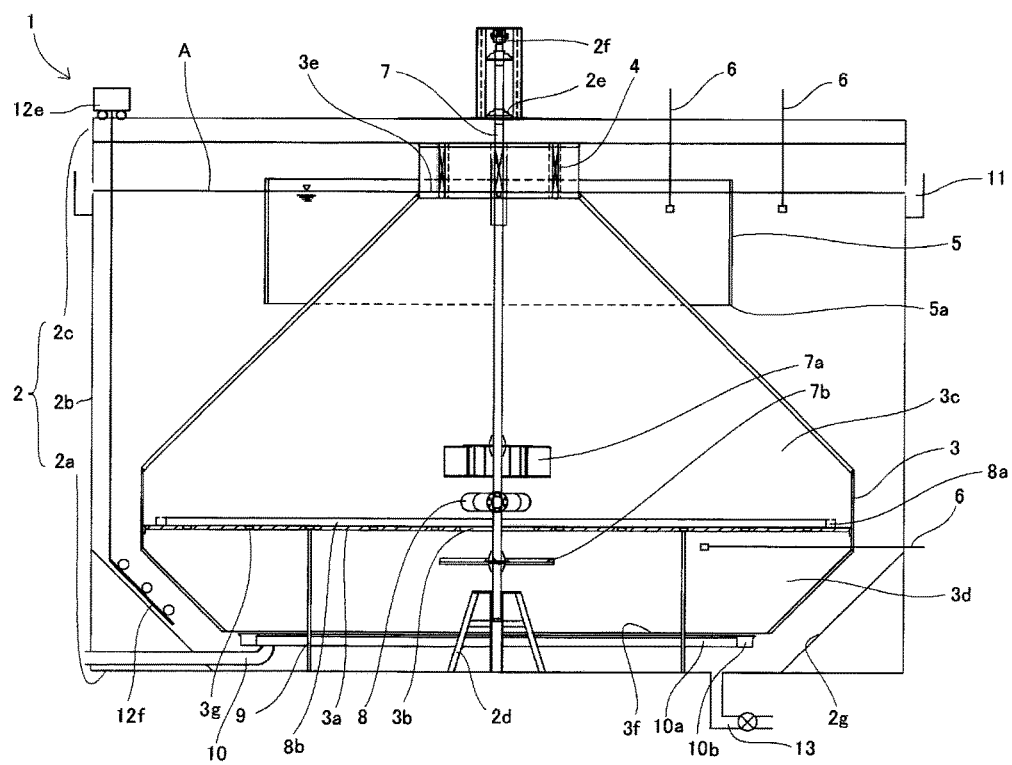
FIG. 5 is a sectional view of the bioreactor provided with a moving fluid spray nozzle.
Figure 6:
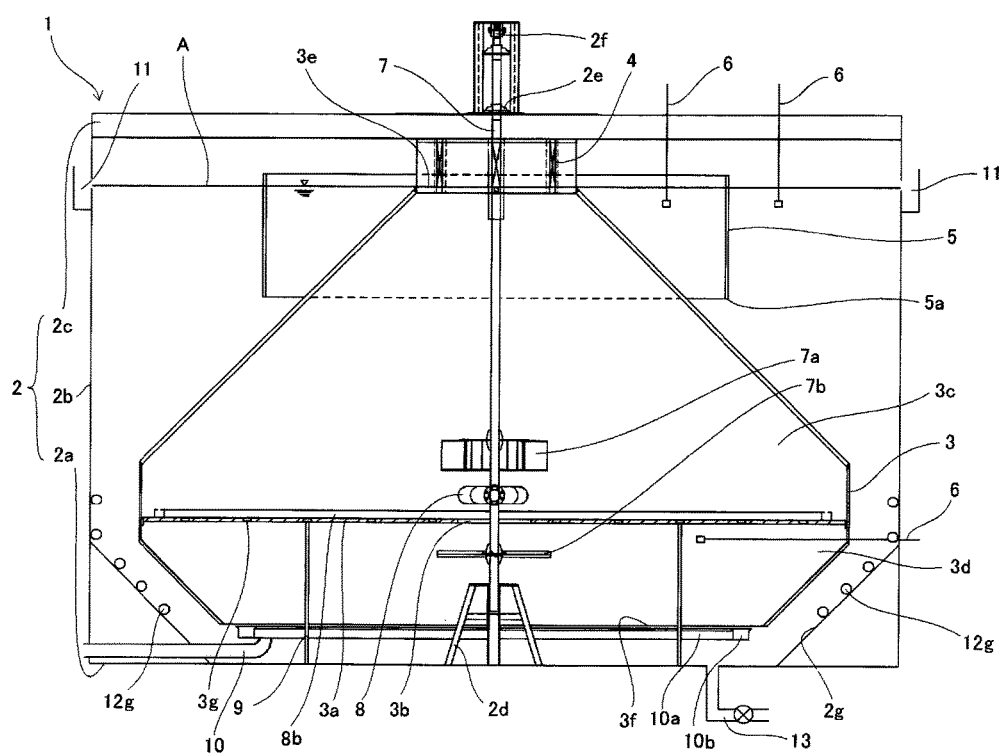
FIG. 6 is a sectional view of the bioreactor provided with a fixed fluid spray nozzle.
Figure 7:
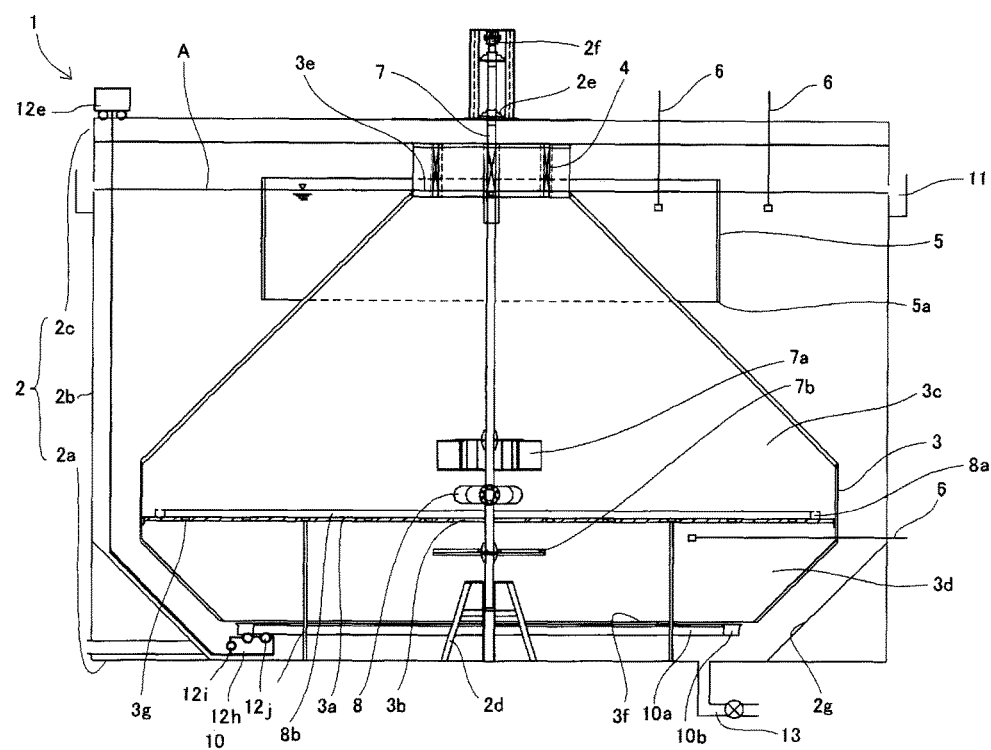
FIG. 7 is a sectional view of the bioreactor provided with a moving fluid spray pump.
Figure 8:
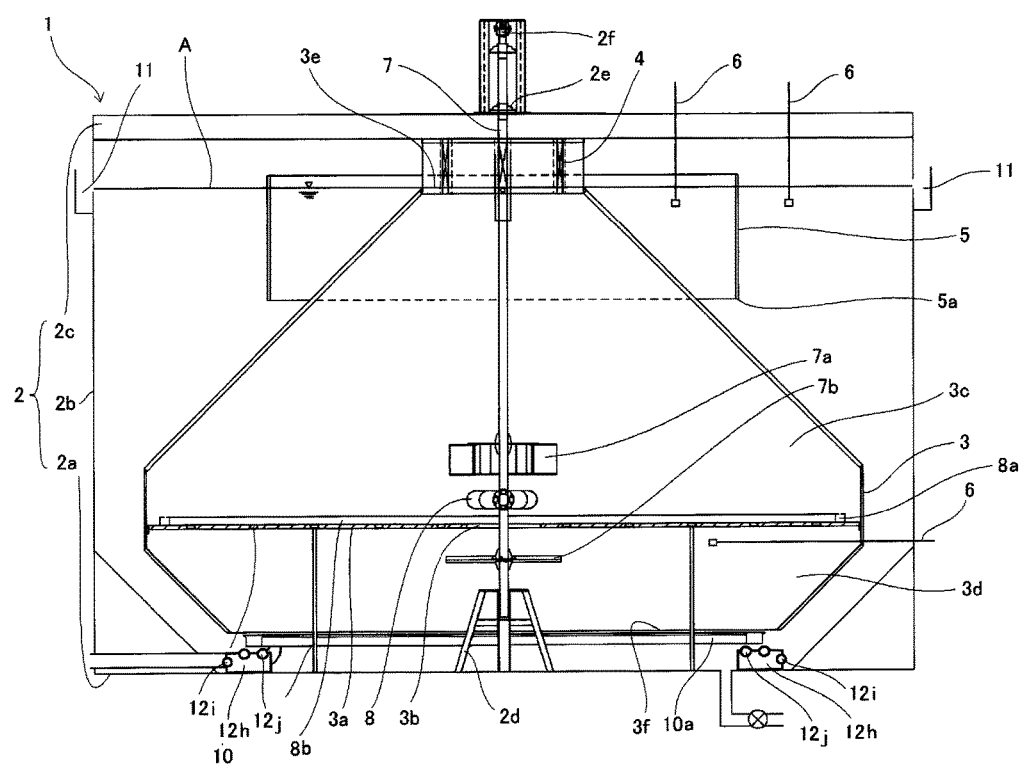
FIG. 8 is a sectional view of the bioreactor provided with a fixed fluid spray pump.

(4) Stirring flow generation device for generating an stirring flow of sludge along the inner wall of the outer tank lower part FIGS. 5 to 8 show a sludge stirring flow generation device. FIG. 5 is a diagram showing a sectional view of a bioreactor in which a moving fluid spray nozzle is provided that sprays fluid while moving along the inclined surface of the inner wall. FIG. 6 is a diagram showing an example of a fluid spray nozzle that is fixed at a prescribed distance on the inclined surface of the inner wall. FIG. 7 and FIG. 8 are diagrams showing an example of a discharge pump that is used instead of a nozzle.

The nozzle 12f that is disposed on the inclined surface of a lower part of the outer tank inner wall shown in FIG. 5 can spray the accumulated sludge with fluid that is conducted from a pump or blower that is housed in the moving device 12e that is attached to the circumferential edge of an upper part of the outer tank. Air, water, sludge, and the like, may be provided as examples of the fluid. Sedimentation-solidification of sludge can be prevented by imparting fluidity to the accumulated sludge by spraying fluid from the nozzle 12f onto the accumulated sludge.

The nozzle 12g shown in FIG. 6 is disposed by fixing it at a prescribed distance in the circumferential and inclined directions on the inclined surface of the lower part of the inner wall of the outer tank at which fluid is to be uniformly sprayed onto the pre-accumulated sludge. The fluid is continually or intermittently sprayed from the nozzle 12g, thereby imparting fluidity to the accumulated sludge and preventing sedimentation-solidification of the sludge. With the fixed nozzle 12g, it is important that the nozzle be provided above the inclined surface of the lower part of the outer tank inner wall, installed in the direction of flow of circulating fluid through the line, thereby producing a configuration in which the circulating flow of sludge is minimally obstructed.

A moving discharge pump 12h that is disposed on a lower surface or inclined surface of the lower part of the outer tank inner wall as shown in FIG. 7 can self-propel along the lower part of the outer tank internal wall by a moving device 12e that is attached to the circumferential edge of an upper part of the outer tank. The discharge pump 12h has a suction nozzle 12i that suctions sludge that has sedimented in a lower part of the outer tank and a discharge opening 12j, where the suctioned sludge is discharged into the anaerobic bioreactor. By self-propelling across the lower part of the outer tank inner wall as suction and discharge of sludge is carried out, fluidity is imparted to the accumulated sludge, and it is possible to prevent sedimentation-solidification of the sludge.

With the fixed discharge pump 12h that is disposed by being fixed on a lower surface or inclined surface of the lower part of the outer tank inner wall shown in FIG. 8, the discharge pump is disposed by fixing it at a location at which accumulation of sludge tends to occur. This discharge pump 12h has a suction nozzle 12i that suctions sludge that has sedimented in a lower part of the outer tank and a discharge opening 12j that discharges the suctioned sludge onto the inside of the anaerobic microorganism treatment tank. With the discharge pump 12h that is disposed by being fixed, it is important that the pump is disposed by a method whereby the circulating flow of sludge is not impeded. For example, the pump lines are all arranged parallel to the direction of flow of the circulating flow of sludge.

The cylindrical inner tank 3 is disposed on the inside of the outer tank on which is provided the device for preventing sedimentation-solidification 12.

The cylindrical inner tank 3 having a roughly cylindrical horizontal sectional shape is divided into a cylinder upper part 3c and a cylinder lower part 3d by a partitioning wall 3a. A communicating hole 3b that connects the cylinder upper part 3c and the cylinder lower part 3d is provided in the center of the partitioning wall 3a.

Due to the presence of the partitioning wall 3a, the cylinder upper part 3c and the cylindrical lower part 3d are sufficiently separated, even when the volume of the bioreactor is large, thereby allowing activated sludge treatment to progress in the respective bioreactors. The aerobic microorganism treatment reaction can thus occur sufficiently in the cylinder upper part 3c, and the anaerobic microorganism treatment reaction can sufficiently occur in the cylinder lower part 3d. When the surface area of the partitioning wall 3a is too great, it is reinforced with a support member 3g or the like.

The diameter of the communicating hole 3b is of a size whereby the activated sludge that has undergone the anaerobic microorganism treatment can move from the cylinder lower part 3d to the cylinder upper part 3c, i.e., the aerobic microorganism treatment part. The diameter of this communicating hole 3b is adjusted in accordance with factors such as the volume of the bioreactor, and the properties and volume of the waste water that is to be treated.

The cylinder upper part 3c has a truncated cone-shaped apex with the upper surface and lower surfaces open. Specifically, the distal end of the cylinder part has a shape whereby the diameter decreases at a predetermined angle in the upwards direction. The angle of inclination of the vertical sectional surface passing through the center of the truncated cone is from 40° to 60°, preferably 45°. By using an angle of inclination in this range, sludge contained in the water to be treated that is discharged from the upper part of the aerobic tank tends to accumulate by flowing down along the truncated cone-shaped outer surface, allowing rapid forced sedimentation of the sludge. In addition, separation of the sludge and the clarified treated water is facilitated through sedimentation of the sludge.

The cylinder upper part 3c is the aerobic microorganism treatment tank that is provided with internal air intake openings 8 and 8a. The air intake opening 8 is provided at the circumferential periphery of the communicating hole 3b, i.e., the circumferential periphery of the center shaft 7, and can be fixed by a support post or the like not shown in the drawings above the partitioning wall 3a. The air discharge opening of the air intake opening 8 preferably faces downwards because it can contribute to stirring of the sludge and the water to be treated in the aerobic tank.

With the air intake opening 8a, an air intake part 8b is disposed in an annular shape as seen from a plan view at a circumferential edge of the partitioning wall in the cylinder upper part 3c. The intake opening may be constituted by multiple air holes 8c that are individually provided in the air intake part 8b or slits that are formed in the upper surface or side surface of the air intake part 8b.

The circulation amount of water to be treated can be varied in the range of 3 to 20 without using a circulation pump by changing the air amount that is taken in by the air intake openings 8 and 8a and the control values of the circulation rate control device described below. The aerobic microorganism treatment thus can be readily established in accordance with suitable nitration conditions, and the anaerobic microorganism treatment thus can be readily established in accordance with suitable denitrification conditions. In addition, because solid and liquid separation of sludge resulting from the principle of forced sedimentation occurs extremely efficiently at the outer circumferential surface of the aerobic microorganism treatment tank having the angle of inclination described above, the aerobic and anaerobic microorganism treatment reaction can be carried out with favorable efficiency in a single vertical-type bioreactor.

An alkali supply opening and an acid supply opening not shown in the drawings can be provided in the aerobic tank.

The cylinder lower part 3d is an anaerobic microorganism treatment tank having a volume of $\frac{1}{10}$ to one times the volume of the cylinder upper part. By using a volume within this range, for example, waste water containing high concentrations of nitrogen-containing contaminant substances can be efficiently subjected to an aerobic microorganism treatment reaction and anaerobic microorganism treatment reaction. A denitrification bacterial nutrient supply opening not shown in the drawings can be provided in the anaerobic microorganism treatment tank.

In addition, when the waste water contains little hydrogen donor and denitrification of nitrate nitrogen is carried out by supplying a hydrogen donor such as acetic acid or methanol, it is preferable for the volume of the anaerobic microorganism treatment tank to be larger than the volume of the aerobic microorganism treatment tank.

The cylinder lower part 3d has a shape wherein an inverted truncated cone is present in the cylinder lower part having an opening part 3f with a surface area that is larger than the opening part 3e of the cylinder upper part 3c. Specifically, the distal end of the cylinder has a shape whereby the diameter decreases at a predetermined angle in the downward direction. By increasing the surface area of the opening part 3f, it is possible to facilitate stirring of sludge in the anaerobic microorganism treatment tank.

When the shape of the cylinder lower part 3d is an inverted truncated cone as described above, it is preferable for the inner surface 2g of the lower part of the outer tank 2 to have the same angle as the predetermined angle described above, because this allows prevention of sludge sedimentation-solidification.

The cylindrical inner tank 3 has a stirring device that allows the treatment reaction between the water to be treated and the activated sludge to occur sufficiently in the anaerobic microorganism treatment tank which is the cylinder lower part 3d and in the aerobic microorganism treatment tank which is the cylinder upper part 3c.

The stirrer is preferably stirring blades 7a and 7b which are fixed to a rotating shaft 7 that is attached to the center of the cylindrical inner tank 3. The stirring blade 7a is provided in the cylinder upper part 3c and is preferably a turbine blade that can bring about a sufficient aerobic microorganism treatment reaction. Other than turbine blades, any configuration may be employed in accordance with the air intake amount that allows mixing of air and water at a comparatively low rate of rotation without causing an extreme decrease in aeration performance.

The stirring blade 7b is provided in the cylinder lower part 3d. Any stirring blade may be used, provided that it brings about a sufficient anaerobic microorganism treatment reaction. However, a turbine blade or propeller blade is preferred.

The partitioning wall 3a that is provided in the cylindrical inner tank 3 is supported by a support post 9 that is provided vertically, fixed to the base 2a which is the bottom surface of the outer tank 2.

The cylindrical inner tank 3 is held in the outer tank by a support that spans the upper part of the outer tank 2 when supported by this support post 9.

A circulation rate control device 4 that controls the circulation rate of water to be treated in the bioreactor is provided in the upper part of the cylindrical inner tank 3. Control of the circulation rate of the water to be treated in the bioreactor by the circulation rate control device 4 is specifically achieved, for example, by opening or closing a liquid surface adjustment valve or raising and lowering a liquid level adjustment plate. When the liquid surface control valve is completely open or when the liquid surface control plate is in its lowest position, the water level of the water to be treated is at its lowest. The water level is represented by A.

Control of the circulation rate in the bioreactor can be carried out in accordance with the amount of air that is taken in from the air intake opening 8 and/or 8a. If a large amount of air is taken in, then the circulation rate increases. Opening and closing the liquid surface adjustment valve and adjustment of the air amount can be used in combination.

As the scale of the aerobic microorganism treatment tank and anaerobic microorganism treatment tank increases, there are cases where the circulating flow of sludge is not sufficiently maintained by using just the aeration air, and adverse effects can occur due to excessive intake of air. The air intake opening indicated by 8a in FIG. 1 is necessary in order to prepare for such cases. Adjustment of the air intake amount and ORP using the air intake opening 8a having poor aeration efficiency has the advantage of making adjustment much easier. With the air intake opening 8a, for example, an air intake part 8b that has an annular shape as seen from a plan view and which connects with an external blower or the like is provided, centered on the stirring blade 7a in the aerobic portion at the upper surface of the partitioning wall 3a, and a hole or slit is provided in this air intake part 8b. This not only simply increases the amount of air, but also manifests baffling effects of the stirring blade 7a, thereby producing synergistic effects that bring about efficient stirring.

By opening or closing the liquid surface adjustment valve and/or adjusting the air intake amount, the circulation rate of the water to be treated can be changed without using a pump. The water to be treated, as described below, is subjected to denitrification and dephosphorization by being circulated from the aerobic microorganism treatment tank 3c through the cylindrical control plate 5 disposed outside this tank to the anaerobic microorganism treatment tank 3d, and from the anaerobic microorganism treatment tank 3d to the aerobic microorganism treatment tank 3c. Consequently, optimal denitrification, dephosphorization, and the like can be carried out by controlling the treatment water circulation rate based on a predetermined control program in accordance with the detected values.

The cylindrical control plate 5 is disposed at the outer circumference of an upper part of the cylindrical inner tank 3. The cylindrical control plate 5 is a cylinder having an open upper surface and lower surface and is disposed so that a lower surface 5a of the cylindrical control plate 5 is adjacent to the inclined surface of the cylindrical inner tank 3. A sludge sedimentation part is formed in an inclined surface portion that is adjacently disposed, and the treatment water is separated as sludge is concentrated. In addition, rapid forced sedimentation of sludge is possible as a result of the adjacent disposition of the lower surface 5a. The separation of the lower surface 5a with respect to the inclined surface of the cylindrical inner tank 3 preferably can be adjusted. In addition, the shape of the cylindrical control plate 5 can be made to be a true cylinder in which the open surfaces of the upper surface and lower surface have the same surface area, or an inverted truncated cone in which the surface area of the opening of the upper surface is larger than the surface area of the opening of the lower surface.

The treated-water quality measurement device 6 is provided inside and outside the outer tank 2 in the bioreactor. The treated-water quality measurement device 6 is a device that measures the pH, ORP, and DO of the water to be treated.

The circulation rate of the water to be treated in the bioreactor of the present invention is 3 to 20, preferably 5 to 20. If the circulation rate of the water to be treated in the bioreactor of the present invention is less than 3, then the aerobic microorganism treatment reaction will occur too easily, whereas if this rate exceeds 20, then the balance between the aerobic microorganism treatment reaction and the anaerobic microorganism treatment reaction will be disrupted, and it will not be possible to carry out denitrification and dephosphorization of the waste water. Specifically, when the circulation rate of the water to be treated is within this range, then the ORP of the water to be treated measured by the treated-water quality measurement device can be maintained at −10 mV or less, preferably −50 mV or less, in the anaerobic microorganism treatment tank, and at +10 mV or greater, preferably +100 mV or greater, in the aerobic microorganism treatment tank. As a result, the aerobic microorganism treatment reaction and anaerobic microorganism treatment reaction will be carried out sufficiently well, and denitrification and dephosphorization will occur continuously. Under such conditions, the pH of the aerobic microorganism treatment tank is in the range of 4.5 to 8.5, preferably 5.5 to 7.5.

The waste water treatment method that employs the bioreactor 1 is a waste water treatment method in which waste water is treated in a treatment process that includes an activated sludge treatment step. The activated sludge treatment step includes a sludge circulation step in which a circulating flow of activated sludge is formed and a waste water addition step in which waste water is added to the activated sludge circulating flow.

The circulating flow of activated sludge is a circulating flow that circulates from the aerobic microorganism treatment tank to the aerobic microorganism treatment tank, bringing about sludge concentration along with separation of treated water at the sludge sedimentation part, with the concentrated sludge being conducted to the anaerobic microorganism treatment tank. In addition, the activated sludge treatment step is a sludge circulation step and a waste water addition step involving treatment using the bioreactor described above.

The waste water treatment method employing the bioreactor 1 has the superior characteristics described below relative to conventional waste water treatment methods.

With conventional waste water treatment methods, waste water and returning sludge are mixed at a fixed ratio and are fed into an aeration tank. Until the thus contacted returning sludge is separated, as is the water to be treated and the sludge in the sedimentation tank of the subsequent step, and until the waste water and the initially contacted and mixed activated sludge are released, contact is made only with the same activated sludge bacteria, and the waste water is caused to flow under pressure.

The waste water treatment method employing the bioreactor 1 is a method in which a circulating flow of activated sludge that circulates vertically is formed, and waste water is added to the circulating flow. A circulation pump is not used in order to produce an activated sludge circulating flow, and a low-energy waste water treatment method results, because the sludge circulating flow is produced by utilizing an upward flow due to the aeration air that is used for the microorganism treatment. In addition, the treatment method allows aeration of the aerobic microorganism treatment tank to be efficiently carried out.

The location where the waste water is added may be anywhere within the circulating flow pathway, preferably at the aerobic microorganism treatment tank, more preferably at the anaerobic microorganism treatment tank. When treatment is carried out using a circulating flow in the waste water treatment method of the present invention, even with waste water having a BOD of 800 mg/L or greater and a total nitrogen content (hereinafter "T-N") of 40 mg/L or greater, operation can be carried out to produce an extremely low treated water BOD of 20 mg/L or less, and in general, the outflow water has a water quality such that the BOD is 10 mg/L or less.

When waste water is added to a sludge sedimentation part in the circulating flow pathway formed at the outer circumferential surface of the cylindrical inner tank, i.e., the aerobic microorganism treatment tank, there are cases where contact between the sludge and the waste water is not sufficient, and adsorption of contaminant substances is not sufficient. In this case, contaminant substances admixed in the partially untreated waste water are admixed in the treated water and can compromise the treated water in some cases. However, in cases where the water quality regulations are relaxed, for example, in applications for primary treatment facilities for release into sewers in which the BOD is 300 mg/L or less or 600 mg/L or less, waste water can be added to the sludge sedimentation part in the circulating flow pathway in some cases.

Figure 9:
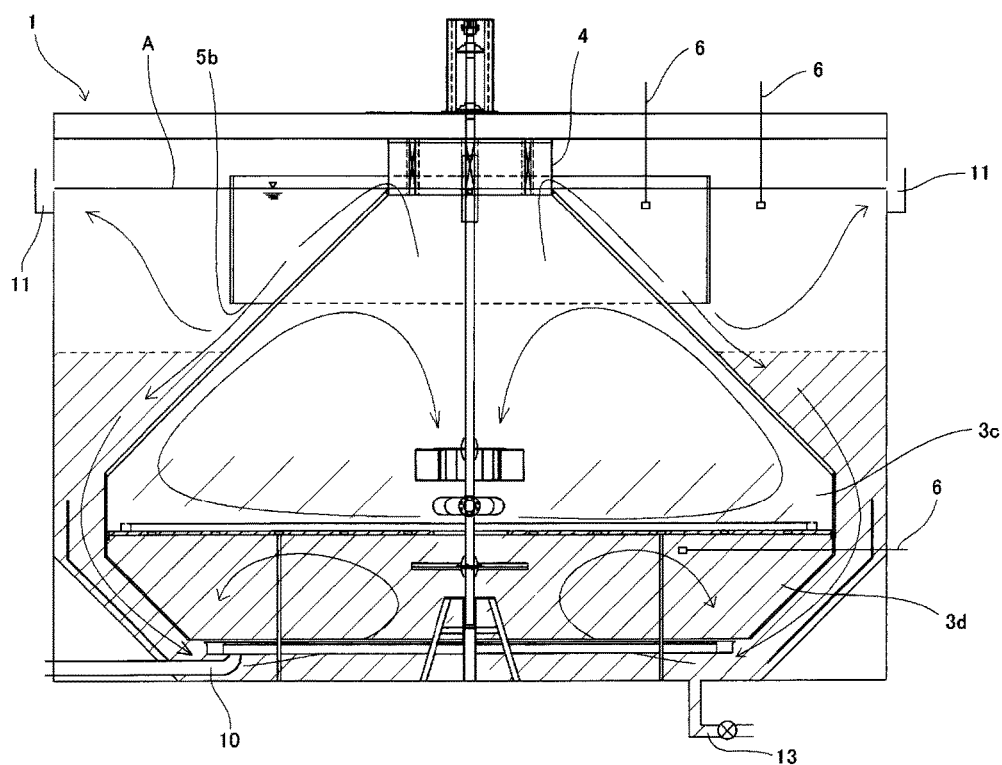
FIG. 9 is a diagram showing the treatment water and activated sludge circulation pathway in the bioreactor.

A waste water treatment method for waste water containing high concentrations of nitrogen-containing contaminant substances that employs the bioreactor 1 is described in detail below with reference to FIG. 9. FIG. 9 is a diagram showing the circulation pathway for the water to be treated and the activated sludge in the bioreactor 1. In FIG. 9, the portions indicated by slanted lines are portions in which the concentration of activated sludge is high, and the arrows indicate the circulation direction of the water to be treated and the activated sludge.

The waste water is water to be treated containing contaminant substances from which the solids content has been separated by a wedge wire screen or the like and is continuously supplied from a waste water supply opening 10 provided in the lowest part of the bioreactor 1. The BOD and the SS of the waste water that is supplied is preferably measured in advance. The waste water treatment method that employs the bioreactor 1 of the present invention is suitable for treating waste water that is discharged from foodstuff plants. In terms of waste water of this type, the waste water has a BOD of 800 mg/L or greater, a chemical oxygen demand (hereinafter "COD") of 300 mg/L or greater, and a T-N of 40 mg/L or greater. In addition, the method is also suitable for the treatment of waste water having a normal hexane-extraction oil concentration (hereinafter "n-Hex") in the range of 50 mg/L or greater.

The activated sludge in the bioreactor 1 is contained at 5000 to 12,000 mg/L based on solids conversion, and the denitrification treatment is carried out as a result of contact of the waste water with the activated sludge in an anaerobic state within the cylinder lower part 3$d$. The activated sludge that is undergoing circulation and the waste water that is the water to be treated which is supplied from the waste water supply opening 10 undergo an anaerobic microorganism treatment reaction as a result of being circulated through the cylinder lower part 3$d$ by an air spray from an air diffusion tube or due to rotation of stirring blades.

Next, the waste water and activated sludge move past the communicating hole 3$b$ in the cylinder upper part 3$c$ that is taking in air, and a nitration reaction, i.e., the aerobic microorganism treatment reaction, progresses while in contact with the activated sludge in the cylinder upper part 3$c$ in an aerobic state as a result of circulation in the cylinder upper part 3$c$ brought about by the air spray from the air intake opening or rotation of stirring blades. As the nitration reaction progresses, the pH, etc. of the water to be treated decreases. The pH, ORP, and DO of the water to be treated are measured by the treated-water quality measurement device 6. Based on these values, the circulation amount of waste water or water to be treated is determined. Specifically, the air intake amount or the like is adjusted and the water to be treated is circulated so that the ORP is maintained at +10 mV or greater in the aerobic reaction treatment part in which the nitration reaction occurs and at −10 mV or less in the anaerobic reaction treatment part in which the denitrification reaction occurs. The circulation amount can be readily adjusted without using a circulation pump or the like by controlling the air amount and/or the circulation rate control device. For this reason, the waste water treatment method of the present invention is a low-energy waste water treatment method. In addition, facilities that contain the bioreactor of the present invention are characterized by being low-power plants, because the respective microorganism reaction units each can be controlled, and this control can be programmed in advance so that automated operation is easily carried out in the absence of humans.

The circulation rate is controlled by the circulation rate control device 4, and a part of the activated sludge and the water to be treated that are discharged from the upper part of the cylinder upper part 3$c$ flows down across the truncated cone-shaped outer circumferential surface having an inclination angle of 45°. The out-flowing water to be treated and activated sludge pass by the sludge concentration part 5$b$ that is formed at the inclined surface and the cylindrical control plate 5 that is disposed in proximity to the inclined surface of the truncated cone-shaped outer circumferential surface, allowing rapid forced sedimentation of the activated sludge. In addition separation of the activated sludge and treated water that has been clarified is facilitated, and the treated water that has been separated is released from the treated water discharge opening 11.

The activated sludge that has undergone rapid forced sedimentation accumulates as a result of concentration of the activated sludge between the inner surface of the outer tank and the outer circumferential surface of the inner tank. The accumulated activated sludge moves into the anaerobic microorganism treatment reaction part while being mixed with water to be treated and circulates through the bioreactor.

With the waste water treatment method of the present invention, as the activated sludge is concentrated, it is circulated at a circulation rate of 3 to 20 through the anaerobic-aerobic tank, and it is thus easy to respond to fluctuations in waste water load. In addition, because the circulation rate is maintained in this range, activated sludge is produced that is optimal for waste water treatment due to acclimatization of the activated sludge.

In the bioreactor, when the nitrogen concentration is high, it is preferable to treat the waste water by adding denitrification bacteria nutrient composed of organic substances such as proton donor, e.g., methanol, to the anaerobic reaction treatment part, regardless of whether the BOD load of the waste water is small. In this case, the pH of the treated water tends to increase, and so an inorganic acid such as hydrochloric acid is preferably added.

The waste water treatment method that employs the bioreactor of the present invention may utilize a single bioreactor, or multiple tanks may be used. In this case, the released water from the first tank is conducted to the waste water supply opening of the second tank. In addition, when, for example, two bioreactors are connected in series, waste water treatment can be carried out more effectively by changing the ratio of the volume of the nitration reaction part and the volume of the denitrification reaction part of the second tank to the ratio in the first tank. Specifically, by decreasing the volume ratio relative to that of the first tank, denitrification and dephosphorization can be carried out.

In addition, the waste water treatment method employing the bioreactor of the present invention can be carried out in combination with conventional waste water treatment methods. For example, with waste water treatment facilities in which existing aerobic nitration tanks and anaerobic denitrification tanks are connected, contaminant substance digestion and denitrification and dephosphorization can be more effectively carried out by supplying the discharge liquid from the respective tanks to the bioreactor of the present invention.

EXAMPLES

Example

Waste water discharged from a food manufacture plant was treated using the bioreactor shown in FIG. 1.

The waste water prior to treatment had a BOD of 1200 mg/L, a chemical oxygen demand (hereinafter "COD") of 750 mg/L, a T-N of 130 mg/L, an n-Hex of 250 mg/L, an SS of 200 mg/L, and a treatment water volume of 1500 m$^3$/day.

The bioreactor had an anaerobic microorganism treatment, part with a volume of 250 m$^3$, and an aerobic microorganism treatment part with a volume of 650 m$^3$. The treated waste water circulation rate in the bioreactor was in the range of 3 to 6.

Waste water that had been pretreated by aeration to produce a positive ORP in a waste water aeration adjustment tank was conducted to the bioreactor and treated. In the bioreactor, the pH at the anaerobic microorganism treatment tank was 6.9, the ORP was −350 mV, and the DO was 0, and the pH at the aerobic microorganism treatment tank was 7.1, the ORP was +210 mV, and the DO was 1.1 mg/L. The microorganism concentration in the aerobic microorganism treatment tank and the anaerobic microorganism treatment tank was 6400 mg/L. In addition, two 25-kW blowers were used as blowers at this time. One was connected to the line of an air intake opening 8a for commercial operation, and the other was connected to an air intake opening 8, i.e., an air diffusion apparatus, while adjusting the air amount with an inverter. The typical air intake amount was 18 m$^3$/min with the two blowers.

Regarding the water quality of the released water discharged from the bioreactor, the BOD was 8 mg/L, the COD was 11 mg/L, the n-hex was 0.8 mg/L, the T-N was 2 mg/L, and the SS was 8 mg/L.

No substantial production of dewatered cake was seen.

Next, the vibration generator 12a shown in FIG. 2 was provided on the bioreactor by fixing it at a distance of 1 m in the circumferential direction to the outside of an inclined portion of the lower part of the outer tank. This vibration generator, known as a vibrating motor, was a 6-pole device with a voltage of 200 V, producing 15.6 Hz vibrations. Prevention of sludge sedimentation was carried out on a cycle of 20 min of vibration and 1 hour of rest.

As a result, the circulating flow of sludge increased, and the amount of water to be treated increased to 2000 m$^3$/day in comparison to when the vibration generator 12a was not used.

With wastewater treatment carried out by the method described above, anaerobic and aerobic conversion is possible while limiting the production of noxious gases in the bioreactor, and thus the autolysis performance of the bacteria themselves increases. In addition, contaminant substances that resist decomposition can be readily treated by acclimatization of bacteria that can selectively decompose the contaminant substances in the waste water through sludge circulation. As a result, effects are seen whereby the discharge amount of dewatered cake is nearly zero.

In addition, waste water treatment in this example allows the aeration air volume to be decreased relative to normal pressure-flow treatment systems described in the comparative examples below. As a result, treatment is possible while decreasing electricity costs by roughly at least half, which also contributes greatly to energy conservation.

Comparative Example 1

Treatment was carried out in the same plant as in the example prior to introduction of the bioreactor of the present invention, and the results are presented as Comparative Example 1 of the present invention. The water quality of the waste waste water prior to treatment was the same as in the Example, with a BOD of 1200 mg/L, a COD of 750 mg/L, a T-N of 130 mg/L, an n-Hex of 250 mg/L, an SS of 200 mg/L, and a treatment water volume of 1500 m$^3$/day.

The waste water discharged from the food manufacture plant was subjected to waste water flow adjustment with a 500 m$^3$ waste water adjustment tank, whereupon, in a coagulation reaction tank, 850 mg/L of polyaluminum chloride (PAC), 380 mg/L of 25-wt % sodium hydroxide, and 1.5 mg/L of anionic macromolecular coagulant were added, thereby producing a coagulated flock. The coagulated flock was then allowed to separate to the top in a 120 m$^3$ pressurized floatation tank, and, after separation of the oil content and SS, treatment was carried out in a 1400 m$^3$ pressurized flow aerobic activated sludge treatment tank. The sludge and treated water were then separated in a 350 m³ sedimentation tank before releasing. In order to maintain the DO at 1.5 mg/L or greater near the outlet of the aeration tank, four 25-kW aeration blowers were used. Regarding the treated water quality after the pressurized floatation treatment the BOD was 900 mg/L, the COD was 550 mg/L, the T-N was 130 mg/L, the n-Hex was 10 mg/L, and the SS was 20 mg/L. In addition, the floating scum that was separated by pressurized flotation generated 22.8 Ton/day of sludge with a water content of 96 wt %, which generated 6 tons of dewatered cake with a water content of 85 wt % daily, produced using a cationic macromolecular coagulant and an anionic macromolecular coagulant. Daily sludge treatment was thus required, and the disposal of 150 ton or more of dewatered cake per day was outsourced.

Regarding the water quality of the released water that was separated at the sedimentation tank, the BOD was 18 mg/L, the COD was 25 mg/L, the n-Hex was 1 mg/L, the T-N was 25 mg/L, and the SS was 5 mg/L. The attempt was made to obtain a released water BOD of 20 mg/L or less by changing the aeration conditions and varying the waste water, but it was frequently difficult to continually maintain the pH of the treated water at 6 or greater.

Comparative Example 2

Treatment was carried out in the same plant as in the example without using a vibration generator, and the results are presented as Comparative Example 2 in order to elucidate the effects of the present invention. The water quality of the waste water prior to treatment was the same as in the Example, with a BOD of 1200 mg/L, a COD of 750 mg/L, a T-N of 130 mg/L, an n-Hex of 250 mg/L, an SS of 200 mg/L, and a treatment water volume of 1500 m³/day.

When operation was carried out without installing the vibration generator 12a, the microorganism concentration in the anaerobic and aerobic microorganism treatment tank decreased to 4000 mg/L or less, and the sludge interface rose. In some cases the SS of the treated water increased to 50 mg/L or greater. This is thought to be due to a decrease in the sludge sedimentation separation capacity in the sedimentation part. In addition, foam was generated at the outlet surface of the aerobic microorganism treatment tank. The water quality of the treated water provided a BOD in excess of 20 mg/L in some cases. Clearly, the amount of adsorbed oil and undecomposed substances in the circulating sludge increased, producing sludge that readily adhered. Situations were observed in which poor treatment occurred as a result of progressive interference of sludge circulation.

INDUSTRIAL APPLICABILITY

The bioreactor of the present invention employs a simple configuration to allow continuous anaerobic and aerobic microorganism treatment of waste water without substantial discharge of excessive amounts of sludge, even in cases where the volume of the bioreactor is large. Thus, the invention can be utilized in treatment facilities for waste water containing high concentrations of contaminant substances.

In addition, the waste water treatment method employing the bioreactor of the present invention can be utilized as a waste water treatment method that causes little environmental damage and provides excellent benefits for the planet.

In comparison to conventional pressurized flow activated sludge treatment methods, the aeration air volume is small, the treated water quality is favorable, electricity consumption is low, and almost no excess sludge is generated. Consequently, the invention can be utilized as a particularly desirable waste water treatment facility in cleaner-production plants where international products are manufactured.

EXPLANATION OF REFERENCE SYMBOLS AND NUMERALS

1 Bioreactor
2 Outer tank
3 Cylindrical inner tank
4 Circulation rate control device
5 Cylindrical control plate
6 Treated-water quality measurement device
7 Rotating shaft
8 Air intake opening
9 Support post
10 Waste water supply opening
11 Treated water discharge opening
12 Sedimentation-solidification prevention device
13 Sludge extraction opening

The invention claimed is:

1. A bioreactor having an outer tank, a cylindrical inner tank disposed inside said outer tank and having openings above and below said cylindrical inner tank, a circulation rate of water control device for controlling the circulation rate of water to be treated in the bioreactor, said circulation rate of water control device being provided at an upper part of said cylindrical inner tank, a cylindrical control plate for bringing about sedimentation of sludge, said cylindrical control plate being provided at an outer circumference of an upper part of said cylindrical inner tank, a treated-water quality measurement device that is provided outside and inside of said cylindrical inner tank, a waste water supply opening that is provided in a circulation pathway of said water to be treated for circulating said water to be treated through said outer tank and said cylindrical inner tank, and a treated water discharge opening that is provided in an upper part of said outer tank;

said cylindrical inner tank being divided by a partitioning wall having a communicating hole in a center part into a cylinder upper part having a volume and a cylinder lower part having a volume, said cylinder upper part being an aerobic microorganism treatment tank having a truncated cone-shaped apex with an upper surface and a bottom surface open to said cylinder lower part, in which multiple air intake openings are provided at a circumferential periphery of said communicating hole in said cylinder upper part and at a circumferential edge of said partitioning wall, said cylinder lower part being an anaerobic microorganism treatment tank having an opening in a bottom surface;

a stirring flow generation device for stirring an interior of said aerobic microorganism treatment tank and said anaerobic microorganism treatment tank and said bioreactor having sedimentation-solidification prevention devices for preventing sedimentation-solidification of sedimented sludge, said sedimentation-solidification prevention devices being provided inside of said outer tank, and being provided inside and outside of said cylindrical inner tank, said sedimentation-solidification prevention device being selected from the group consisting of (1) a vibrating device that is provided on an inner wall of a lower part of said outer tank or an outer wall of a lower part of said outer tank where sludge sediments, (2) a scraper that is provided on said inner wall of a lower part of said outer tank where sludge sediments, and (3) a stirring flow generation device that generates a stirring flow of sludge along said inner wall of a lower part of said outer tank;

said bioreactor comprising means for detecting at least one measurement value selected from hydrogen ion concentration, oxidation reduction potential, and dissolved oxygen content of said water to be treated as measured by said treated-water quality measurement device and wherein said device for controlling said circulation rate of water to be treated in said bioreactor is 3 to 20, said circulation rate being calculated by dividing volume of treated water in $m^3$/day that is discharged from said inner tank by volume of waste water supply in $m^3$/day, said circulation rate being controlled by at least one of an aperture of a liquid surface adjustment valve, a vertical movement of a liquid surface adjustment control plate, and an amount of air taken in from said multiple air intake openings in accordance with a detected measured value;

wherein waste water supplied from said waste water supply opening is continuously subjected to anaerobic microorganism treatment and aerobic microorganism treatment as as it is circulated through the bioreactor, along with activated sludge, via the interior of said cylindrical inner tank, an outer circumferential surface of said cylindrical inner tank, and an interior of said activated sludge that has sedimented in said lower part of said outer tank.

2. The bioreactor according to claim 1, characterized in that said vibration device that is provided on said inner wall of said lower part of said outer tank comprises a vibrating plate that is provided near said inner wall of said lower part of said outer tank and a vibration generator that is provided on said upper part of said outer tank wherein said vibration generator transmits vibration to said vibrating plate.

3. The bioreactor according to claim 1, characterized in that said stirring flow generation device is a moving fluid spray nozzle that sprays fluid while moving along an inclined surface of said inner wall of said lower part of said outer tank.

4. The bioreactor according to claim 1, characterized in that said stirring flow generation device is a fluid spray nozzle that is fixed at a predetermined distance on an inclined surface of said inner wall of said lower part of said outer tank.

5. The bioreactor according to claim 1, characterized in that the stirring flow generation device is a pump that sucks in said activated sludge that has sedimented at a lower part of said outer tank and discharges said activated sludge inside said anaerobic microorganism treatment tank while moving across a lower surface or an inclined surface of said inner wall of said lower part of said outer tank.

6. The bioreactor according to claim 1, characterized in that said stirring flow generation device is a pump that is fixed at a predetermined distance on a lower surface or an inclined surface of said inner wall of said lower part of said outer tank and sucks in sludge that has sedimented at a lower part of said outer tank and discharges said sludge inside said anaerobic microorganism treatment tank.

7. The bioreactor according to claim 1, characterized in that said waste water supply opening is provided at said lower part of said outer tank, said waste water supply opening comprising multiple discharge openings or slits that are provided in an annular waste water supply part disposed in a lower part of said opening of said anaerobic microorganism treatment tank.

8. The bioreactor according to claim 1, characterized in that said cylinder lower part has a volume of 1/10 to 1 times said volume of said cylinder upper part.

9. The bioreactor according to claim 1, characterized in that said cylindrical inner tank is disposed in an inner part of said outer tank as a result of said partitioning wall being supported by a support post that is disposed in said outer tank.

10. The bioreactor according to claim 1, characterized in that the stirring flow generation device is a stirring blade that is attached to a center shaft of said cylindrical inner tank.

11. The bioreactor according to claim 1, characterized by said cylinder lower part having a shape of an inverted truncated cone with an opening that has a larger surface area than said opening of said cylinder upper part.

* * * * *